(12) United States Patent
Parker

(10) Patent No.: US 6,454,501 B1
(45) Date of Patent: Sep. 24, 2002

(54) CARGO SECURING SYSTEM

(76) Inventor: Neil Parker, 23 St Marys Way, Burghfield Common Berks RG7 34R (GB)

( * ) Notice: Subject to any disclaimer, the term of this patent is extended or adjusted under 35 U.S.C. 154(b) by 0 days.

(21) Appl. No.: 09/732,555

(22) Filed: Dec. 8, 2000

(51) Int. Cl.$^7$ .................................................. B60P 7/14
(52) U.S. Cl. ........................ 410/149; 410/121; 410/140; 410/143; 410/118; 410/100
(58) Field of Search ...................... 410/121, 129, 410/143, 140, 94, 118, 96, 97, 100; 220/520, 529, 530, 531, 532, 507, 552; 224/42.33, 42.34, 403; 296/34.1, 37.5, 37.6

(56) References Cited

U.S. PATENT DOCUMENTS

| | | | |
|---|---|---|---|
| 2,919,662 A | * 1/1960 | Tobin | 410/140 X |
| 3,377,044 A | * 4/1968 | Jackson et al. | 410/96 |
| 4,170,946 A | * 10/1979 | Youness | 410/129 |
| 4,313,702 A | * 2/1982 | DiMartino | 410/94 |
| 4,917,429 A | 4/1990 | Giger | |
| 5,427,487 A | * 6/1995 | Brosfske | 410/121 |
| 5,526,972 A | 6/1996 | Frazier et al. | |
| 5,590,824 A | 1/1997 | Weeks | |
| 5,697,742 A | * 12/1997 | House | 410/127 |
| 5,724,778 A | 3/1998 | Cornell et al. | |
| D397,322 S | 8/1998 | Tobin | |
| 5,819,996 A | 10/1998 | Koon, Jr. | |
| 5,865,580 A | * 2/1999 | Lawrence | 410/118 |
| 5,961,263 A | * 10/1999 | Nunez | 410/103 |
| 6,007,283 A | * 12/1999 | Labeur | 410/129 X |
| 6,077,007 A | * 6/2000 | Porter et al. | 410/140 |
| 6,089,803 A | * 7/2000 | Holland | 410/129 |
| 6,089,804 A | * 7/2000 | Bartelt | 410/140 |
| 6,109,846 A | * 8/2000 | Davis et al. | 410/100 |
| 6,109,847 A | * 8/2000 | Patel et al. | 410/129 |
| 6,174,116 B1 | * 1/2001 | Brand | 410/140 |
| 6,206,624 B1 | * 3/2001 | Brandenburg | 410/132 |
| 6,234,733 B1 | * 5/2001 | Parr | 410/94 |

FOREIGN PATENT DOCUMENTS

| | | |
|---|---|---|
| EP | 0381911 | 2/1989 |
| GB | 2229982 | 10/1990 |
| GB | 2292548 | 2/1996 |
| GB | 2306568 | 5/1997 |
| GB | 2308108 | 6/1997 |
| WO | WO 97/10121 | 3/1997 |

* cited by examiner

*Primary Examiner*—Stephen T. Gordon

(57) ABSTRACT

A cargo securing system for securing and organizing cargo being carried by a vehicle. The cargo securing system includes at least one divider chain assembly and at least one anchor chain assembly. The anchor chain assembly is mountable on one of the spaced walls. The divider chain assembly is removably couplable to the anchor chain assembly. In an embodiment each of the chain assemblies includes a chain comprising a plurality of panels and a plurality of intermediate members alternately linked together.

17 Claims, 4 Drawing Sheets

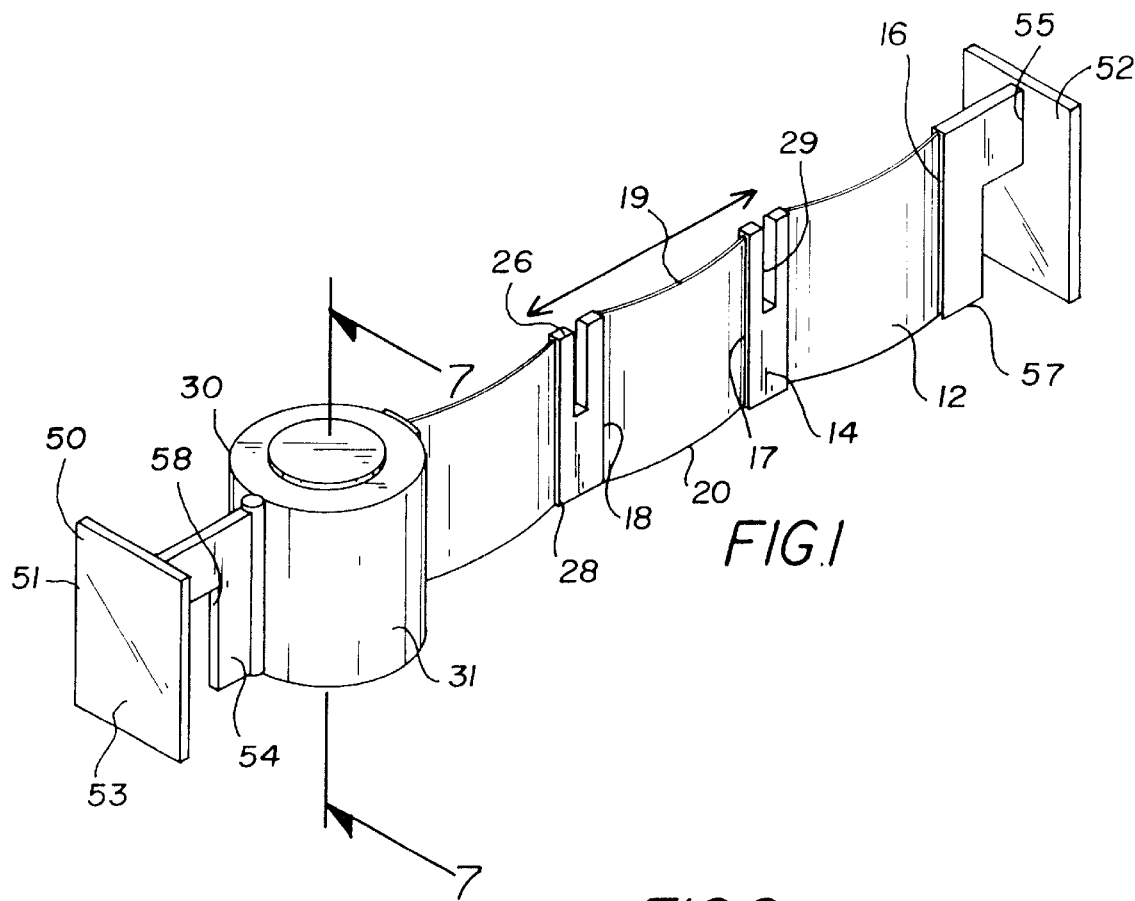
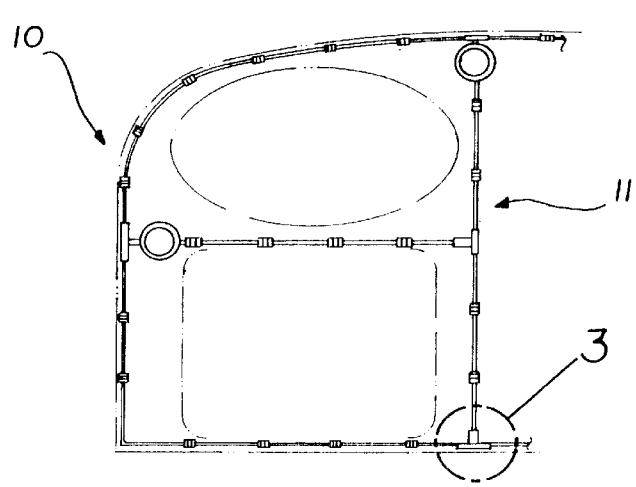

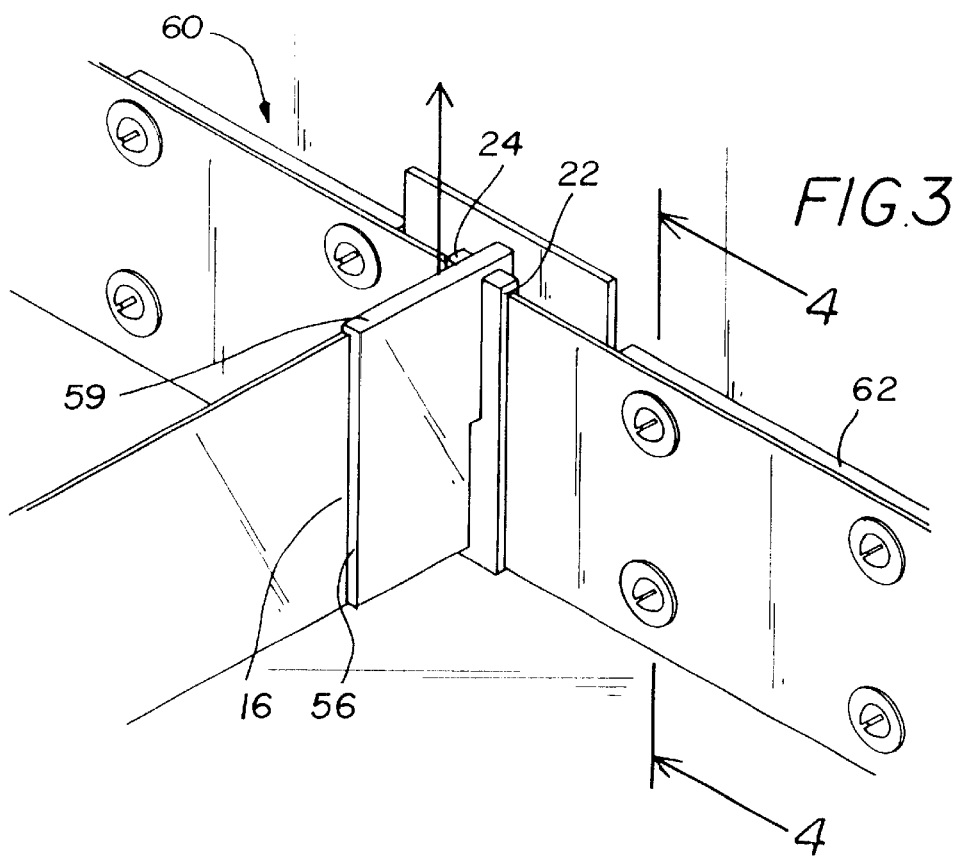
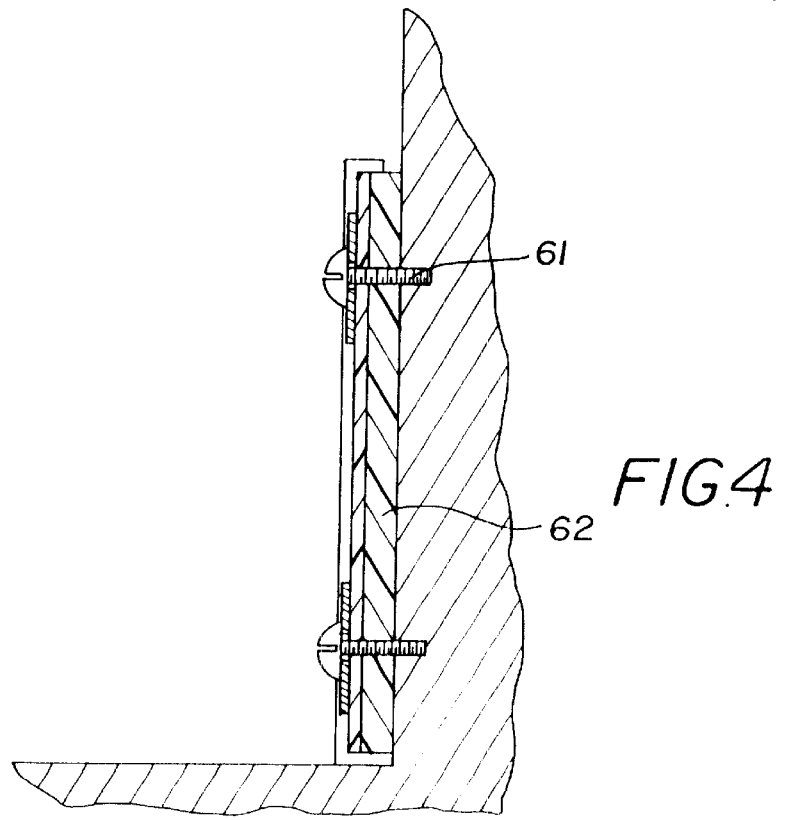

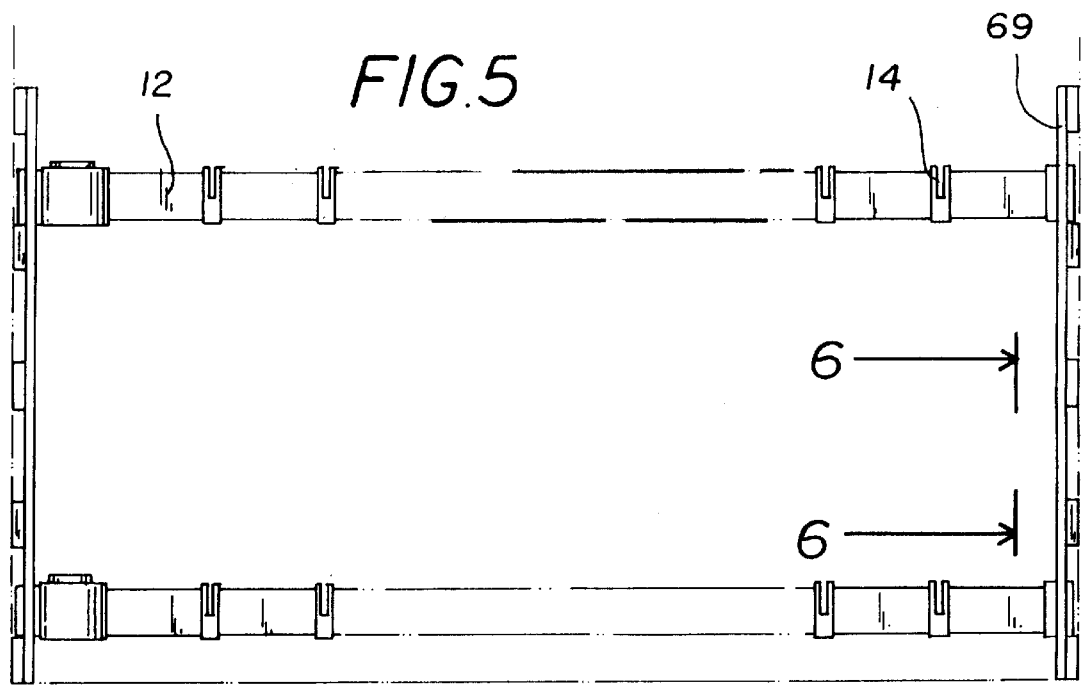
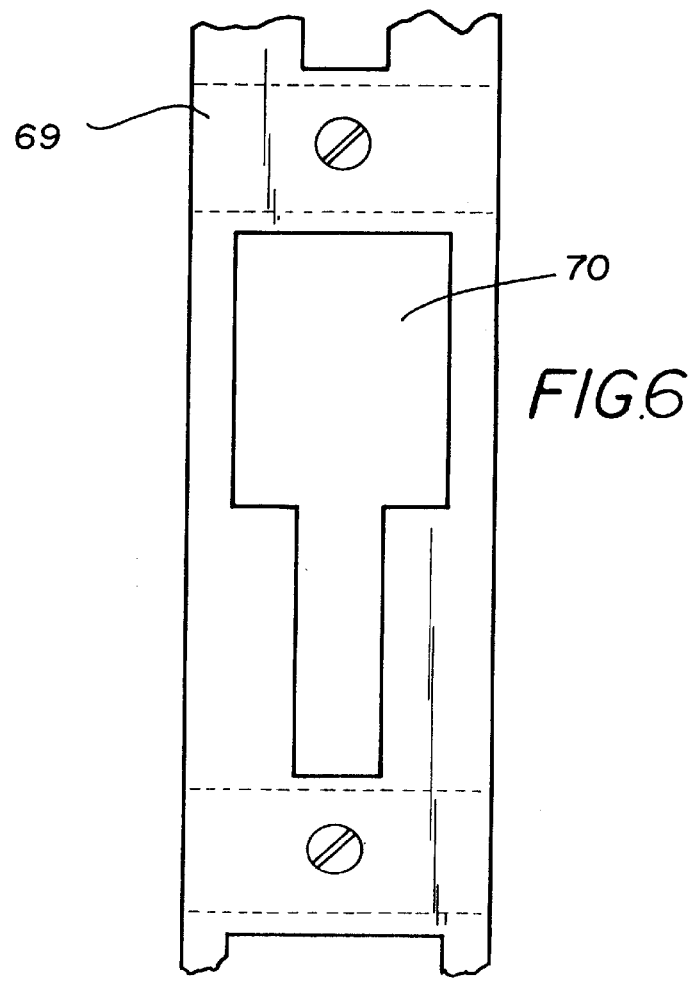

CARGO SECURING SYSTEM

BACKGROUND OF THE INVENTION

1. Field of the Invention

The present invention relates to securing devices and more particularly pertains to a new cargo securing system for securing and organizing cargo being carried by a vehicle.

2. Description of the Prior Art

The use of securing devices is known in the prior art. More specifically, securing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,526,972; U.S. Pat. No. 5,590,824; U.S. Pat. No. 5,819,996; U.S. Pat. No. 5,724,778; U.S. Pat. No. 4,917,429; and U.S. Pat. No. Des. 397,322.

While these devices fulfill their respective, particular objectives and requirements, the aforementioned patents do not disclose a new cargo securing system. The inventive device includes at least one divider chain assembly and at least one anchor chain assembly. The anchor chain assembly includes a chain that is mountable on one of the walls of the vehicle. The divider chain assembly is removably couplable to the anchor chain assembly at various locations on the anchor chain. Each of the chain assemblies includes a chain comprising a plurality of panels and a plurality of intermediate members alternately linked together.

In these respects, the cargo securing system according to the present invention substantially departs from the conventional concepts and designs of the prior art, and in so doing provides an apparatus primarily developed for the purpose of securing and organizing cargo being carried by a vehicle.

SUMMARY OF THE INVENTION

In view of the foregoing disadvantages inherent in the known types of securing devices now present in the prior art, the present invention provides a new cargo securing system construction wherein the same can be utilized for securing and organizing cargo being carried by a vehicle.

The general purpose of the present invention, which will be described subsequently in greater detail, is to provide a new cargo securing system apparatus and method which has many of the advantages of the securing devices mentioned heretofore and many novel features that result in a new cargo securing system which is not anticipated, rendered obvious, suggested, or even implied by any of the prior art securing devices, either alone or in any combination thereof.

To attain this, the present invention generally comprises at least one divider chain assembly and at least one anchor chain assembly. The anchor chain assembly includes a chain that is mountable on one of the walls of the vehicle. The divider chain assembly is removably couplable to the anchor chain assembly at various locations on the anchor chain. Each of the chain assemblies includes a chain comprising a plurality of panels and a plurality of intermediate members alternately linked together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cargo securing system apparatus and method which has many of the advantages of the securing devices mentioned heretofore and many novel features that result in a new cargo securing system which is not anticipated, rendered obvious, suggested, or even implied by any of the prior art securing devices, either alone or in any combination thereof.

It is another object of the present invention to provide a new cargo securing system which may be easily and efficiently manufactured and marketed.

It is a further object of the present invention to provide a new cargo securing system which is of a durable and reliable construction.

An even further object of the present invention is to provide a new cargo securing system which is susceptible of a low cost of manufacture with regard to both materials and labor, and which accordingly is then susceptible of low prices of sale to the consuming public, thereby making such cargo securing system economically available to the buying public.

Still yet another object of the present invention is to provide a new cargo securing system which provides in the apparatuses and methods of the prior art some of the advantages thereof, while simultaneously overcoming some of the disadvantages normally associated therewith.

Still another object of the present invention is to provide a new cargo securing system for securing and organizing cargo being carried by a vehicle.

Yet another object of the present invention is to provide a new cargo securing system which includes at least one divider chain assembly and at least one anchor chain assembly. The anchor chain assembly is mountable on one of the walls of the vehicle. The divider chain assembly includes a chain that is removably couplable to the anchor chain assembly at various locations on the anchor chain. Each of the chain assemblies includes a chain comprising a plurality of panels and a plurality of intermediate members alternately linked together.

Still yet another object of the present invention is to provide a new cargo securing system that is adaptable to carrying a variety of cargo of different sizes and shapes. The flexible characteristic of the present invention enables it to secure most cargo and prevent it from moving and being damaged in transportation. The flexibility of the present invention also optimizes the cargo storage area. Unlike the prior art that partitions a cargo storage area into defined sections, thus losing cargo space, the present invention partitions a cargo storage area to the size of the cargo being carried. The ability to secure the cargo in a more defined area also reduces the potential that the vehicle or a person will be injured by the unsecured cargo move about the cargo storage area.

Even still another object of the present invention is to provide a new cargo securing system that is easily disassembled, thereby allowing a user to use the entire cargo storage area when needed. Unlike the prior art that generally uses rigid hard to disassemble partitioning devices, the present invention is disassembled by merely lifting a divider. No tools are required for removing a divider.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a divider chain assembly of the new cargo securing system according to the present invention.

FIG. 2 is a schematic top view of the present invention particularly illustrating an anchor chain assembly mounted on the perimeter of a vehicle cargo storage area and a pair of divider chain assemblies extending across the cargo storage area.

FIG. 3 is a schematic perspective view of the present invention showing the connection of a divider chain to an anchor chain.

FIG. 4 is a schematic cross-sectional view of the anchor chain taken along line 4—4 in FIG. 3.

FIG. 5 is a schematic side view of the present invention showing a plurality of divider chains mounted in vertical tiers for use with tall cargo.

FIG. 6 is a schematic view taken from the vantage of line 6—6 in FIG. 5 showing a vertically extending member permitting securing of a plurality of divider chains in vertical tiers.

DESCRIPTION OF THE PREFERRED EMBODIMENT

Figure 7:
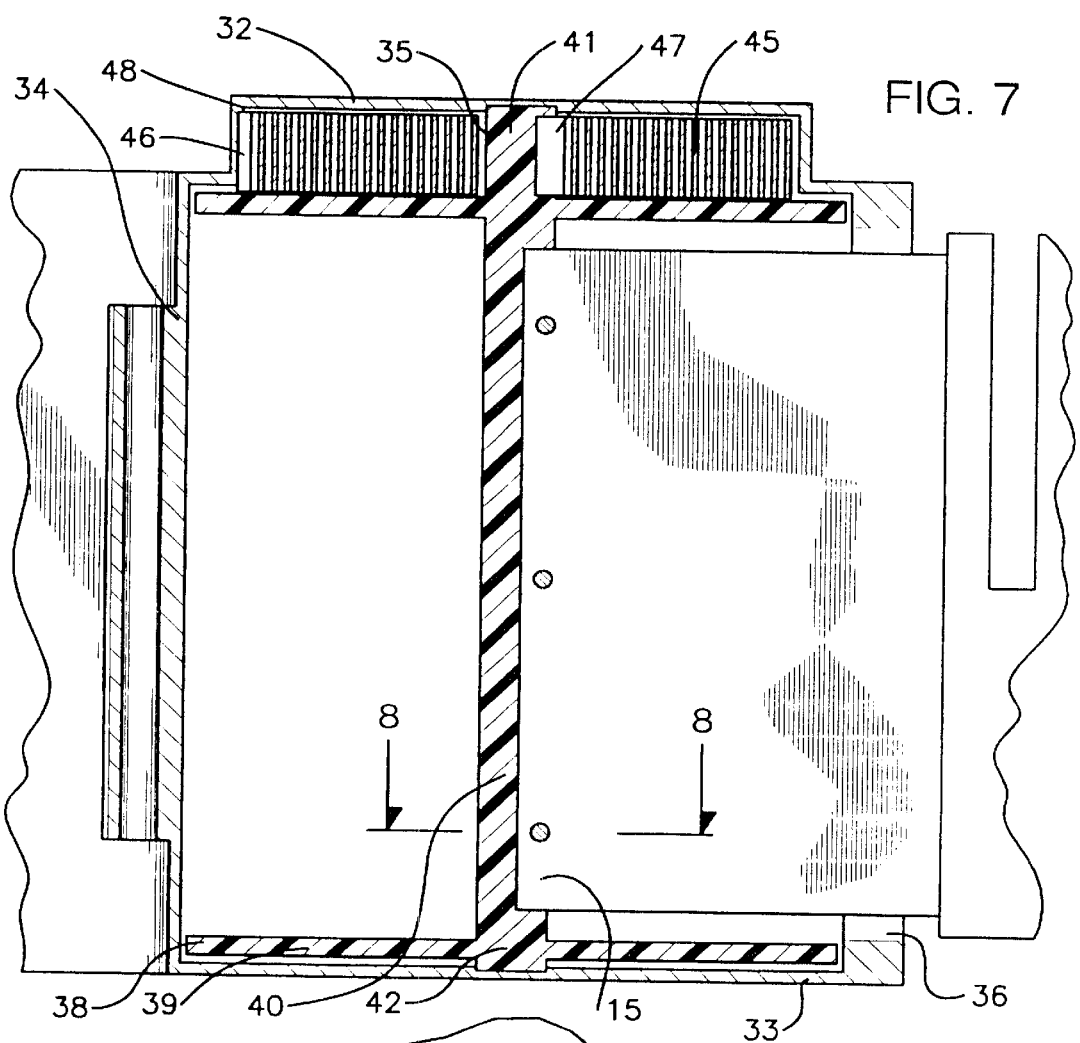
FIG. 7 is a schematic cross-sectional view of the housing of a divider chain showing the housing, spool and biasing spring used to retract a divider chain into the housing.
Figure 8:
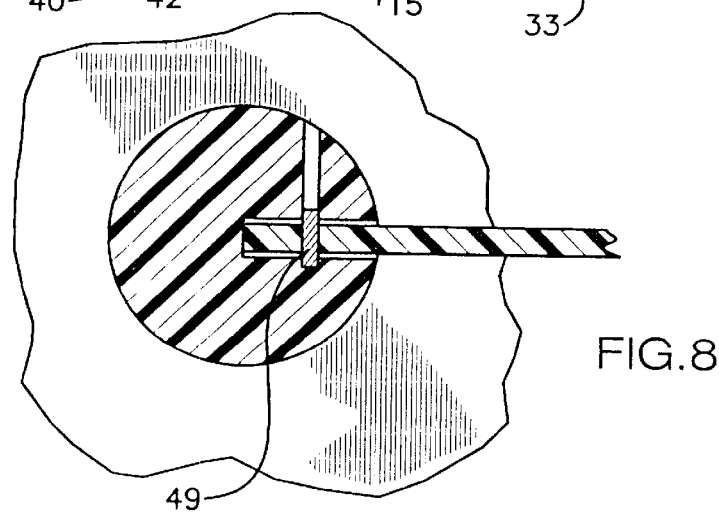
FIG. 8 is a schematic cross-sectional view of the spool taken along line 8—8 of FIG. 7.

With reference now to the drawings, and in particular to FIGS. 1 through 8 thereof, a new cargo securing system embodying the principles and concepts of the present invention and generally designated by the reference numeral 10 will be described.

As best illustrated in FIGS. 1 through 8, the cargo securing system 10 generally comprises a plurality of chains 11. Each of the chains 11 comprises a plurality of panels 12 and a plurality of intermediate members 14 which are linked together in an alternating manner. Each of the chains 11 includes a first free end 15 and a second free end 16. Each of the panels 12 preferably includes a first end 17, a second end 18, a top edge 19 and a bottom edge 20. Each of the panels 12 comprises a resiliently flexible material, such as, for example, a cloth or rubber material.

Each of the intermediate members 14 is coupled to a pair of panels 12 such that each of the first ends 17 of the panels 12 is attached to one of the first side edges 22 of the intermediate members 14 and each of the second ends 18 of the panels 12 is attached to one of the second side edges 24 of the intermediate members 14. Each of the intermediate members 14 includes a top edge 26 and a bottom edge 28. Each of the top edges 26 of the intermediate members 14 includes a notch 29 extending from the top edge 26 toward the bottom edge 28. The notches 29 may have a generally rectangular shape extending approximately half a length of the intermediate member 14. Each of the intermediate members 14 may comprise a relatively rigid material as compared to the material of the panels 12, such as a plastic.

The cargo securing system 10 generally includes at least one divider chain assembly 30 that includes a housing for retractably storing one of the chains 11. The housing 31 includes a top wall 32 and a bottom wall 33 orientated substantially parallel to each other. The housing 31 also includes a peripheral wall 34 that is integrally coupled to and extends between the top wall 32 and the bottom wall 33 of the housing 31. The top wall 32 may include a chamber 35 formed therein. The chamber has a generally circular shape with a diameter relatively smaller than a diameter of the peripheral wall 34. The peripheral wall 34 of the housing 31 includes an elongated slot 36 extending therethrough. The elongated slot 36 extends generally between the top and bottom walls 32 and 33. The elongated slot 36 has a width and height designed for receiving of one of the chains 11 into the housing 31. The housing 31 may comprise a substantially rigid material such as, for example, a metal such as steel or aluminum.

As illustrated in FIG. 7 a spool 38 is rotatably mounted in the housing 31. One of the ends 15 of the chain 11 is mounted on the spool 38. The chain 11 is coiled about the spool 38 and is extendable from and retractable into the housing 31. The spool 38 comprises a pair of disks 39. A first of the disks 39 is positioned generally adjacent to the top wall 32. A second of the disks 39 is positioned generally adjacent to the bottom wall 33. A rod 40 extends between a central portion of the disks 39. A first end 41 of the rod 40 extends into the chamber 35 and is rotatably mounted on the top wall 32. A second end 42 of the rod 40 is rotatably mounted on the bottom wall 33. The spool 38 may comprise a substantially rigid material such as, for example, steel or a plastic.

As also illustrated in FIG. 7, a biasing means 45 for biasing the chain 11 into a retracted condition is positioned in the housing 31. The biasing means 45 is positioned in the chamber 35 between the top wall 32 and the first disk 39. The biasing means 45 preferably comprises a spring having a first end 46 and a second end 47. The first end 46 of the spring 45 is attached to an inner surface 48 of the chamber 35. The second end 47 of the spring 45 is securably attached to the rod 40. The spring 45 most preferably comprises a coil spring. In one embodiment, there is a securing means 49 for securing one of the free ends 15 and 16 of the chain 11 to the rod 40. The securing means 49 may comprise a pin. The pin extends through the panel 12 and into the rod 40.

One of the diver chain assemblies 30 includes a pair of brackets 50. One of the brackets 50 is coupled to the second free end 16 of the divider chains 11. Another one of the brackets 50 is coupled to the peripheral wall 34 of the housing 31. Each of the brackets 50 comprises a first plate 51. The first plate 51 includes a front surface 52 and a back surface 53. The first plate 51 may have a generally rectangular shape. A second plate 54 is attached to one of the free ends 15 and 16 of the chain 11. The second plate 54 includes a first edge 55 and a second edge 56. The first edge 55 of the second plate 54 is attached to and orientated substantially perpendicular to the front surface 52 of the first plate 51 such that the bracket 50 has a generally T-shape. The second edge 56 of the second plate 54 is attached to the second free end 16 the divider chain assembly 30. A bottom edge 57 of the second plate 54 includes a slit 58 extending therein toward a top edge 59 of the second plate 54 giving the second plate 54 a generally inverted L-shape. The slit 59 is positioned generally adjacent to the first plate 51. Each of the brackets 50 preferably comprises a substantially rigid material such as steel or plastic.

In one embodiment, at least one of the chains 11 is mountable on one of the spaced walls for forming an anchor chain assembly 60. The anchor chain assembly 60 comprises a fastening means 61 for removably fastening the anchor chain 11 to one of the spaced walls. The fastening means 61 extends through each of the panels 12 and is removably coupled to one of the spaced walls. The fastening means 61 is spaced between a pair of intermediate members 14. Each of the fastening means 61 may comprise a screw. However, clips or hook and loop fasteners may also be used.

The anchor chain assembly 60 also includes a plurality of spacing members 62 for spacing the anchor chain 11 away from one of the spaced walls. Each of the spacing members 62 is positioned between one of the panels 12 and one of the spaced walls. In one embodiment, the fastening means 61 is extendable through each of the spacing members 62. Each of the spacing members 62 may comprise a substantially rigid material such as, for example, steel or a plastic.

In use, the slit 58 of one of the brackets 58 on the divider chain assembly 30 may be removably engaged in the notch 29 of one of the intermediate members 14 of the anchor chain assembly 60 or the intermediate member 14 of another of the divider chain assembly 30. The divider chain assembly 30 may be wrapped around a piece of cargo and both ends fastened to an anchor chain assembly 60, thereby preventing the piece of cargo from moving about the cargo area.

In one embodiment having a vertically deep cargo area, the anchoring chain 11 may be fastened in a vertical condition such that each end of the chain 11 is adjacent to a roof and a floor of the cargo area. In this embodiment, an anchor strap 69 is provided that extends substantially vertically. Each of the anchor straps 69 of the anchor chain 11 includes a hole 70 extending therein. The hole 70 extends through each of the panels 12 and has a generally T-shape adapted for removably receiving one of the brackets 50. One of the spacing members 62 is positioned on each side of the hole 70. The fastening means 61 extends through the spacing members 62 and into one of the spaced walls.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cargo securing system for organizing cargo between spaced walls, said system comprising:

at least one divider chain assembly;

at least one anchor chain assembly being mountable on one of the spaced walls, said divider chain assembly is removably couplable to said anchor chain assembly; and wherein said divider chain assembly includes a divider chain and said anchor chain assembly includes an anchor chain, each of said chains comprising a plurality of panels and a plurality of intermediate members being alternately linked together, said divider chain being flexible along its length to permit coiling of said divider chain;

wherein said divider chain assembly additionally comprises a housing retractably storing said divider chain.

2. The cargo securing system of claim 1 wherein said divider chain assembly further includes a spool being rotatably mounted in said housing, an end of said divider chain being mounted on said spool.

3. The cargo securing system of claim 1, wherein said divider chain assembly further includes a bracket coupled to said housing for removably coupling said divider chain to one of said intermediate members of another of said chains.

4. The cargo securing system of claim 1, wherein each of said panels of said anchor chain have a hole extending therethrough, said hole extending through each of said panels of said anchor chain having a generally T-shape.

5. The cargo securing system of claim 1, further comprising a fastening means for removably fastening said anchor chain to one of the spaced walls, said fastening means extending through each of said panels and being removably coupled to one of the spaced walls, said fastening means being spaced between a pair of said intermediate members.

6. The cargo securing system of claim 1, wherein said housing includes a top wall and a bottom wall orientated substantially parallel to each other, a peripheral wall being integrally coupled to and extending between said top wall and said bottom wall, said top wall having a chamber formed therein, said peripheral wall of said housing having an elongated slot extending therethrough for said divider chain to pass through.

7. The cargo securing system of claim 6, additionally comprising biasing means for biasing said divider chain into a retracted condition in said housing, said biasing means being positioned in said housing, and wherein said spool comprises a pair of disks, a first of said disks being positioned generally adjacent to said biasing means, a second of said disks being positioned generally adjacent to said bottom wall, a rod extending between said disks, a first end of said rod extending into said chamber and being rotatably mounted on said top wall, a second end of said rod being rotatably mounted on said bottom wall.

8. The cargo securing system of claim 7, wherein said biasing means comprises a coil spring having a firs end and a second end, said first end of said coil spring being attached to an inner surface of said chamber, a second end of said coil spring being securably attached to said spool.

9. The cargo securing system of claim 3, wherein said bracket comprises a first plate having a front surface, a second plate having a first edge attached to a free end of said divider chain and pivotably coupled to a peripheral wall of said housing, said first edge of said second plate being attached to said front surface of said first plate.

10. The cargo securing system of claim 9, wherein said second plate includes a bottom edge having a slit extending therein toward a top edge of said second plate, said slit being positioned generally adjacent to said first plate, said slit being removably interlockable with a notch extending downwardly from a top edge of each of said intermediate members.

11. The cargo securing system of claim 10, additionally comprising a bracket mounted on a free end of the divider chain of said divider chain assembly for removably coupling said free end of said divider chain to another one of said chains.

12. The cargo securing system of claim 5, further comprising a plurality of spacing members for spacing said anchor chain away from one of the spaced walls, each of said spacing members being positioned between one of said panels and one of the spaced walls, wherein said fastening means is extendable through each of said spacing members.

13. A cargo securing system for organizing cargo between spaced walls, said system comprising:

at least one divider chain assembly;

at least one anchor chain assembly being mountable on one of the spaced walls, said divider chain assembly is removably couplable to said anchor chain assembly; and wherein said divider chain assembly includes a divider chain and said anchor chain assembly includes an anchor chain each of said chains comprising a plurality of panels and a plurality of intermediate members being alternately linked together;

a fastening means for removably fastening said anchor chain to one of the spaced walls, said fastening means extending through each of said panels and being removably coupled to one of the spaced walls, said fastening means being spaced between a pair of said intermediate members.

14. The cargo securing system of claim 13, further comprising a plurality of spacing members for spacing said anchor chain away from one of the spaced walls, each of said spacing members being positioned between one of said panels and one of the spaced walls, wherein said fastening means is extendable through each of said spacing members.

15. A cargo securing system for organizing cargo between spaced walls, said system comprising:

at least one divider chain assembly;

at least one anchor chain assembly being mountable on one of the spaced walls, said divider chain assembly is removably couplable to said anchor chain assembly; and wherein said divider chain assembly includes a divider chain and said anchor chain assembly includes an anchor chain each of said chains comprising a plurality of panels and a plurality of intermediate members being alternately linked together; and wherein each of said panels of said anchor chain have a hole extending therethrough, said hole extending through each of said panels of said anchor chain having a generally T-shape.

16. The cargo securing system of claim 15, further comprising a fastening means for removably fastening said anchor chain to one of the spaced walls, said fastening means extending through each of said panels and being removably coupled to one of the spaced walls, said fastening means being spaced between a pair of said intermediate members.

17. The cargo securing system of claim 16, further comprising a plurality of spacing members for spacing said anchor chain away from one of the spaced walls, each of said spacing members being positioned between one of said panels and one of the spaced walls, wherein said fastening means is extendable through each of said spacing members.

* * * * *